United States Patent Office 3,057,829
Patented Oct. 9, 1962

3,057,829
COPOLYMERS OF DIALLYL BARBITURIC ACIDS AND VINYL MONOMERS
Charles D. Wright, White Bear Lake, Minn., assignor to Minnesota Mining and Manufacturing Company, St. Paul, Minn., a corporation of Delaware
No Drawing. Filed Dec. 5, 1960, Ser. No. 73,522
8 Claims. (Cl. 260—77.5)

This invention relates to certain new and very useful copolymers of diallylbarbituric acid compounds with certain vinyl monomers, and to methods for making the same.

More particularly, this invention relates to a class of copolymers prepared by reacting diallylbarbituric acid compounds of the general formula:

(1)
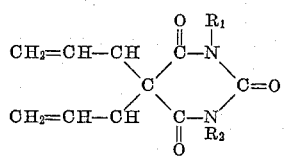

where $R_1$ and $R_2$ can be the same or different and are selected from the group consisting of hydrogen and lower alkyl, with certain vinyl compounds of the formula:

(2)

where— when X and Y are both hydrogen, Z is selected from the group consisting of chlorine, bromine, lower acyloxy, lower alkoxycarbonyl, lower perfluoroalkoxy carbonyl, carboxy, cyano and phenyl;

when X is hydrogen and Y is methyl, Z is selected from the group consisting of carboxy, lower alkoxycarbonyl, and lower perfluoroalkoxy carbonyl;

when X is hydrogen, Y and Z are each individually selected from the group consisting of chlorine and cyano;

when Z is hydrogen, X and Y are identical and are selected from the group consisting of hydroxy, carboxy, and lower alkoxycarbonyl and X and Y taken together with the two carbon atoms between them form a ring structure selected from the group consisting of 1,3-dioxol-2-one and dihydrofuran-2,5-dione; and when Y is hydrogen, X and Z are each individually lower alkoxycarbonyl.

In the copolymers of this invention the compounds of Formula 1 are present in the copolymerized form to an extent of from about 1 to 80 mole percent while the compounds of Formula 2 are present in the copolymerized form in an amount ranging from about 99 to 20 mole percent. Preferred copolymers of this invention are those in which the compounds of Formula 1 are present in the copolymerized form to an extent from about 20 to 60 mole percent while the compounds of Formula 2 are present in the copolymerized form in an amount ranging from about 80 to 40 mole percent. Certain copolymers of this invention exist in either of two forms, a carboxylic acid form and a carboxylic acid salt form. Sometimes mixtures of these two forms are possible. Such copolymers are those which contain a free carboxyl group or a functional group which, can be hydrolyzed to the free carboxyl form. These functional groups are lower alkoxy carbonyl, lower perfluoroalkoxy carbonyl, carboxy and carboxylic acid anhydrides (as when maleic anhydride is the vinyl monomer of Formula 2). As a practical matter, this means that carboxylate salt-forming copolymers of this invention are those made by reacting a compound of Formula 1 with vinyl monomers selected from the group consisting of maleic anhydride, lower alkyl acrylates, lower alkyl methacrylates, lower alkyl maleates, lower alkyl fumarates, and acrylic, methacrylic, maleic, and fumaric acids. The cations in these salts are selected from the group consisting of alkali metals, ammonium, or mono-, di-, or tri-organo substituted ammonium radicals, such as butylammonium, dimethylammonium, trimethylammonium, tetrabutylammonium, and ammonium cations of ephedrine, papaverine and the like.

Also, certain copolymers of this invention can exist in the barbituric acid salt form wherein the polymerized barbituric acid rings contain the negative charge. In these salts the cations are the same as defined above. Such barbituric acid salts are prepared from those copolymers wherein the copolymerized diallylbarbituric acid contains at least one hydrogen on the nitrogen atoms of the ring, that is where either $R_1$ or $R_2$ or both $R_1$ and $R_2$ in Formula 1 are hydrogen.

The copolymers of this invention are very unusual in that they are soluble copolymers of a diolefin with a vinyl monomer. By the term "soluble" is meant that the copolymers can be dissolved in polar organic solvents. Therefore the polymers are of finite molecular weight and are not completely crosslinked. Thus polar solvents usually can be found which will dissolve these copolymers. However, copolymers formed from highly polar comonomers may be difficultly soluble in polar solvents and still possess a finite molecular weight as those skilled in the art of polymer chemistry will appreciate.

It is theorized that this solubility results because cyclization of the diolefin occurs at each additional step during the copolymerization. Thus the diolefin copolymerizes essentially as a monofunctional monomer. This solubility feature is especially unusual in the high molecular weight copolymers of this invention. As the art appreciates, diolefins ordinarily are used as crosslinking agents in vinyl polymerization and so tend to minimize solubility of the resulting polymer, but in the present instance the diolefin has not caused cross-linking and instead has itself cyclized, producing this most unexpected effect of solubility in these product copolymers. The copolymers of invention are thus substantially linear, by which is meant that these copolymers are of finite molecular weight and are soluble as described above.

Another very unusual feature of the copolymers of this invention is their high reactivity towards copolymerization with vinyl monomers of Formula 2 above. As is well known, 1-olefins do not readily copolymerize with these same vinyl monomers of Formula 2. It should be noted that the monomers for Formula 1 contain this 1-olefinic structure and therefore one would not expect the observed high reactivity associated with the copolymer products of this invention. It is believed that this unusual reactivity to copolymerization is associated with the presence of the second double bond in the heptadiene structure of Formula 1 compounds. The opportunity for cyclization seems to enhance the reactivity of both double bonds. Perhaps anchimeric assistance is involved.

The copolymers of this invention have a number of interesting and very useful utilities. The number and variety of these utilities is increased because the copolymers are soluble. Thus, they are useful as soil conditioners. The high molecular weight copolymers are useful for the production of films as by conventional casting from solution. Specifically, they can be used for protective and decorative coatings, as well as for insulating coatings on electrical equipment. They also find use as components of adhesive formulations. These copolymers are also useful for making molded articles, such as copolymers which contain copolymerized vinyl chloride, styrene, vinylidene, chloride, methacrylates, and the like. In addition, the presence of small amounts of copolymerized compounds of Formula 1 with polymerized acrylonitrile increases the ease of dyeability of the resulting fiber forming copolymer.

The copolymers of the present invention especially the lower weight ones, are biologically active. They have some herbicidal and fungicidal utility. Also, they have hypnotic activity. For this purpose salts of the copolymers are particularly desirable, since in their salt form the copolymers are especially soluble in aqueous media, making administration simple in mammals.

Certain copolymers of this invention appear to have a capacity for adhering to the surfaces of metals and thereby form durable protective films.

By the term high molecular weight copolymers of this invention, is meant those copolymers which have inherent viscosities greater than about 0.1 at concentrations of one gram of copolymer per 100 milliliters of a solvent such as dimethyl formamide. Similarly low molecular weight copolymers of this invention are those copolymers having inherent viscosities less than about 0.1 at concentrations of one gram of copolymer per 100 milliliters of solvent such as dimethyl formamide. In general, the copolymer products of this invention are non-tacky solids at room temperature, except for certain copolymers of Formula 1, compounds with, respectively, lower vinyl esters (such as vinyl acetate) and lower alkyl acrylates (such as ethyl acrylate). These latter copolymers tend to be tacky at room temperature (i.e. about 25° C.), the tackiness increasing with decreasing amounts of Formula 1 compounds. Inherent viscosity determinations in this application were made at room temperatures (25° C.).

The molecular weight of the copolymers of the invention is decreased by the addition of an active chain transfer agent during polymerization. Thus, molecular weight can be minimized by copolymerizing in the presence of a chain transfer agent of high chain transfer reactivity, such as ethyl thioglycolate, for example. Very low molecular weight copolymers of the invention, which are especially useful as biologically active materials, can thus be prepared easily. In general, active chain transfer agents are, of course, well known to the art, and usually consist of organic compounds selected from the class of mercaptans, disulfides, and various halogenated compounds. Specific examples of suitable chain transfer agents include n-butyl mercaptan, dibutyl disulfide, carbon tetrachloride, chloroform, benzal chloride, and the like.

Chain transfer activity has been quantitatively determined and described in terms of the chain transfer constant in a polymerization with styrene. These transfer constants which are determined for styrene are also applicable to the vinyl monomers of Formula 2 above. A high chain transfer constant indicates a high chain transfer reactivity and, hence, that a particular chain transfer agent is especially effective in lowering molecular weight of product polymers. For example, when one wishes to prepare a low molecular weight copolymer of diallylbarbituric acid with methyl acrylate, a suitable chain transfer agent for inclusion with these monomers in the reaction system is n-butyl mercaptan.

The following Table I gives chain transfer constants of preferred chain transfer agents for use in this invention.

TABLE I

Transfer Constants for Styrene at 60°

| | $10^5 \times C_S$ [a] |
|---|---|
| Isopropyl benzene | 8.2 |
| Diphenylmethane | 23 |
| Triphenylmethane | 35 |
| Fluorene | 750 |
| Pentaphenylethane | 200,000 |
| Isobutyl chloride | 14 |
| n-Butyl iodide | 18.5 |
| Carbon tetrachloride | 920 |
| Methallyl chloride | 240 |
| Carbon tetrabromide | 136,000 |
| Benzyl chloride | 15.6 |
| Benzal chloride | 500 |
| Benzotrichloride | 575 |
| Propargyl alcohol | 70 |
| Butyraldehyde | 57 |
| Benzoin | 400 |
| t-Butyl mercaptan | 360,000 |
| n-Butyl mercaptan | 2,200,000 |
| n-Dodecyl mercaptan | 1,900,000 |
| Ethyl thioglycolate | 5,800,000 |
| Dibutyl disulfide | 1,250 |
| bis-(p-Carboxyphenyl) disulfide | 16,000 |
| Phenyl phosphine | 44 |

[a] $C_S$ is defined in "Principles of Polymer Chemistry," P. J. Flory, Cornell University Press, Ithaca, New York (1953), p. 141–145.

The properties and related utilities of the copolymers of this invention can also be varied by changing the respective mole ratios of comonomers of Formulas 1 and 2 above in the copolymers of this invention. In general, as the mole ratio of Formula 1 compounds is increased, the polarity of the polymer is increased. As an example, the copolymer of diallylbarbituric and vinyl acetate can be cited. As the mole ratio of diallylbarbituric acid in the copolymer is increased, the glass transition temperature of the copolymer is increased and the adhesive properties of the resulting copolymer are accordingly changed.

Since the biological activity is closely related to the presence of the copolymerized compounds of Formula 1, a high concentration of these materials is desirable. A preferred concentration is 20 to 80 mole percent of compounds of Formula 1 in the copolymers of the invention.

The mole ratios of comonomers in the copolymers is dependent upon the weight of the reactants charged to the reaction vessel during the preparation of these copolymers and also upon the extent to which polymerization occurs. From a knowledge of the approximate relative reactivities of the Formula 1 compounds in copolymerization, it is possible to choose the weight of reactants so that copolymers containing desired mole ratios of each comonomer can be prepared. The tendency of Formula 2 compounds to copolymerize with Formula 1 compounds differs considerably. The tendency of a comonomer to copolymerize has been conveniently classified in terms of the relative reactivity ratios of such comonomers with the various polymer radicals. Thus, Flory, in Principles of Polymer Chemistry, published by the Cornell University Press, Ithaca, New York, in 1953, has a table (see page 188) showing the reactivity ratios of several representative vinyl monomers. The relative reactivity values for diallylbarbituric acid are similar to those for vinyl chloride or vinyl acetate. Indeed, it is possible to predict that, in general, all monomers which have a relative reactivity ratio greater than about 0.02 with vinyl acetate or vinyl chloride polymer radicals can be copolymerized with diallylbarbituric acid compounds of Formula 1.

The copolymers of this invention are prepared by heating a mixture of at least one compound from Formula 1, at least one compound from Formula 2, and a free radical initiator, all contained in a polar solvent.

By the term "free-radical initiator" or just "radical initiator" reference is had in this application to conventional agents capable of initiating polymer formation. In general the initiators are either heat sensitive or involve the so-called redox systems. Any suitable radical initiator known to the art can be used to initiate the reaction. Suitable heat sensitive or thermally activated radical initiators include, for example, such materials as benzoyl peroxide, azobisisobutyronitrile, ditertiary butyl peroxide, lauroyl peroxide, dicumyl peroxide, peracetic acid, cumylhydroperoxide, and the like. Suitable redox type radical initiators include, for example, combinations of such materials as sodium bi-sulfite, and ammonium per-sulfate, sodium bi-sulfate and sodium per-sulfate, and the like. Broadly any redox system known to the art is suitable for use in this invention. The redox systems of radical initiators are usually employed in emulsion copolymerization.

By the term of "polar solvent" reference is had to solvents containing at least one polar group per molecule. Specifically, reference is had to those solvents which have a solubility parameter greater than about 9.9 or 10.

A tabulation of the solubility parameters of some common solvents is found in the Official Digest, 27, 743 (1955).

Specific examples of suitable polar solvents for use in this invention include acetonitrile, dimethylformamide, and dimethylsulfoxide, dioxane, and the like.

In general, all polar solvents can be used which are non-reactive with both the reagents and their associated radicals used in forming a given copolymer of this invention. Thus, in general, the polar solvents do not partake in a given reaction and so are not incorporated into a polymer chain. It should be noted, however, that sometimes one can use as the solvent the chain transfer agent itself, in which case, the solvent becomes incorporated into the copolymer product. An example of such a chain transfer agent which could be used as a solvent, is chloroform. Obviously, one uses a solvent which dissolves at least a portion of each reactant.

The use of a solvent in the processes of this invention is incidental and not critical but offers the advantage of controlling reactions in which there is considerable exotherm. It is also an advantage where the respective monomers are solids at polymerization temperatures. Usually the polar solvent employed is one which is inert over the range of reaction conditions involved.

I prefer to employ an amount of polar solvent at least sufficient to facilitate mixing of reactants. Thus, I prefer to use an amount of solvent at least about equal in weight to the combined weight of the reactants employed in any given reaction.

In general the amounts of respective monomers used is determined by the desired mole proportions of the reactants desired in the final product.

Ordinarily, in solution copolymerization procedures, one simply adds the compounds of Formulas 1 and 2 to the desired liquid diluent which already contains the radical initiator. The resulting mixture is agitated to insure mixing, and heated preferably in a temperature range where the initiator is substantially decomposed. Reaction times of 16 hours or less are usually customarily employed depending upon decomposition rate. The time necessary to substantially decompose the initiator will vary with the temperature at which the copolymerization reaction is carried out.

In a continuous process for making the copolymers of this invention, one adds the respective monomers stepwise, even continuously to a reaction medium maintained at the proper temperature for optimum copolymerization to produce the particular polymers desired.

Generally speaking, the temperature used in carrying out the polymerization or reaction in a polar solvent in this invention is one which affords a satisfactory conversion of the comonomers to copolymers while at the same time effecting a decomposition of the radical initiator. It is not necessary that the radical initiator be completely decomposed in a given process or reaction but this is desirable in order to obtain good conversions of comonomers to the desired copolymer product. As a practical matter, the temperatures I use to tend to fall in the range from about 50 to 100° C.

The copolymers of this invention are also prepared by emulsion polymerization. In this technique, which is well known to the art, a mixture of the comonomers, water, an emulsifying agent, a free radical initiator and optionally a chain transfer agent or promoter is agitated and heated in the absence of oxygen. By empulsifying agent is meant a compound which causes formation of micelles in which polymerization occurs. Suitable emulsifying agents include detergents, soaps and certain non-ionic compounds. Specific examples include aryl alkyl sulfonates, sodium stearate and polyoxyethylene lauryl ether.

Suitable free radical initiators are discussed above. One good type is the alkali metal persulfates.

Copolymers of the invention which contain anhydride, ester, nitrile or carboxyl functional groups are hydrolyzed to the carboxylate salt form by treatment with dilute aqueous base at 50–100° C. until dissolution occurs. The free carboxylic acid form of the copolymers are in turn obtained when the solutions of the salts are acidified with 3 N hydrochloric acid.

In addition barbituric salts, in which some of the polymerized barbituric acid rings are present as anions, are prepared from each of the copolymers of the invention. Ordinarily the copolymers are treated with a strong base such as concentrated aqueous caustic, sodium alkoxides in polar solvents and quaternary ammonium hydroxides. Specific examples are concentrated aqueous sodium hydroxide, sodium methoxide in ethanol and tetramethyl ammonium hydroxide. Those copolymers which contain anhydride, ester, nitrile or carboxyl groups before hydrolysis also contain carboxylate salt groups after such treatment with a strong base.

The invention is further understood by reference to the following examples:

EXAMPLE 1

*Experimental*

*Preparation of vinylene carbonate-diallylbarbituric acid copolymer.*—A mixture of vinylene carbonate (5.0 g.), diallylbarbituric acid (12.1 g.), acetonitrile (13.0 ml.) and azo-bisiobutyronitrile (1.7 g.) is sealed in a thick walled evacuated glass ampoule. The mixture is heated for 16 hours at 80° C. A solid and a liquid are present after reaction. The contents of the ampoule are poured into dry ether. A light tan solid precipitates and is recovered by filtration and is air dried. The weight of copolymer product is 3.2 g. The copolymer is reprecipitated from dimethyl formamide into ether and is dried at 0.1 mm. at 56° C. for 16 hours, wt., 2.43 g.

*Analysis.*—Found: C, 55.7. Calculation of mole ratios of comonomers is 1:3.7 moles vinylene carbonate to moles of diallylbarbituric acid. The infrared spectrum contains absorption bands consistent for the barbituric acid ring and for a smaller quantity of carbonate groups. There is no indication of unreacted residual allyl groups which would be present if cyclization during polymerization has not occurred. The inherent viscosity in dimethyl formamide, at 1.00 g./100 ml. is 0.058.

EXAMPLE 2

*Preparation of maleic anhydride-diallylbarbituric acid copolymer.*—A mixture of maleic anhydride (7.05 g.), diallybarbituric acid (15.0 g.), acetonitrile (15 ml.) and benzoyl peroxide (2.0 g.) in a sealed glass ampoule is heated for 16 hours at 80° C. The contents solidify to a tan solid. The solid is washed with dry ether and air dried. The copolymer is reprecipitated from dimethyl formamide into ether. The resulting sticky mass is stirred well until it turns to a fine solid which is further washed with ether and dried at 0.1 mm. at 56° C. for 16 hours. The weight of light tan solid is 20 g.

*Analysis.*—Found: C, 54.6; N, 10.5. Calculation of mole ratios is 1 mole maleic anhydride/1.06 mole dial. The infrared spectrum contains absorption bands consistent for the barbituric acid ring and for anhydride groups. There are no absorption bands for unreacted allyl groups. The inherent viscosity of the copolymer product in dimethyl formamide at 1.00 g./100 ml. is 0.095.

The following examples presented in tabular form as Table II show the preparation of additional copolymers of the invention. In each instance the designated diallylbarbituric acid is reacted with a specified vinyl monomer. Weights of each reactant are expressed in grams. In all examples 20 ml. of acetonitrile is used as the solvent, and 2 grams of benzoylperoxide is used as the radical initiator. The general procedure used is like that described in Example 1 above. Reaction temperature is about 80° C., maintained for about 16 hours. Each product has an inherent viscosity greater than 0.1 for 1 gm. of copolymer in 100 ml. dimethyl formamide.

portion of the product of Example 1 to warm 3 normal (about 50° C.) aqueous, ammonium hydroxide until complete dissolution occurs. Addition of the aqueous solution of the salt to excess ethanol then results in the precipitation of the salt as a white solid which is recovered by filtration.

Using the same procedure one obtains ammonium carboxylate salts from the copolymers as prepared in Examples 6, 7, 8, 9, 10, 11, 14, 15, 16, 17, 20, 21 and 23.

EXAMPLE 25

The sodium carboxylate salt of the copolymer product

TABLE II

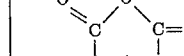

EXAMPLE 22

A mixture of 54.9 parts of diallylbarbituric acid, 45.1 parts of vinyl acetate, 180 parts of water, 7.0 parts of sodium lauryl sulfate and 2.00 parts by weight of potassium persulfate is placed in a suitable flask. The mixture is purged with nitrogen and a nitrogen atmosphere is maintained while the mixture is stirred and heated at about 60° C. for about ten hours. The mixture is added to a two fold excess of methanol. The solid copolymer which precipitates is recovered by filtration and dried.

EXAMPLE 23

A mixture of 20.8 g. of diallylbarbituric acid, 17.2 g. of methyl acrylate, 0.10 g. of n-butyl mercaptan, 25 ml. of acetonitrile and 2.0 g. of benzoyl peroxide is kept under an atmosphere of nitrogen and is agitated and heated at about 80° C. until about ten percent conversion occurs. The mixture is added to an excess of dry ether with vigorous stirring. A white solid precipitates which is the low molecular weight copolymer of diallylbarbituric acid and methyl acrylate. This solid is recovered by filtration and is dried.

EXAMPLE 24

The copolymer product of Example 1 is hydrolyzed to produce the ammonium carboxylate salt by adding a portion of the product of Example 1 to warm 3 normal (about 50° C.) aqueous, ammonium hydroxide until complete dissolution occurs.

of Example 1 is obtained when 3 normal sodium hydroxide is used in place of the ammonium hydroxide according to the procedure described in Example 24.

The sodium salts of the copolymer products of Examples 6, 7, 8, 9, 10, 11, 14, 15, 16, 17, 20, 21 and 23 are also obtained by this procedure.

EXAMPLE 26

The copolymer product of Example 1 is hydrolyzed to produce the tetramethyl ammonium barbituric acid carboxylic acid salt when a portion of the product of Example 1 is added with vigorous stirring to a solution of tetramethyl ammonium hydroxide in ethanol at room temperature. The resulting salt product is insoluble and is recovered by filtration. The salt is hygroscopic and is very soluble in water.

Using this same procedure one obtains the barbituric acid carboxylic acid tetramethyl ammonium salts from the copolymer products of Examples 6, 7, 8, 9, 10, 11, 14, 15, 16, 17 and 23.

EXAMPLE 27

The copolymer product of Example 5 is hydrolyzed to produce the tetramethyl ammonium barbituric acid salt when a portion of the copolymer product from Example 5 is added with vigorous stirring to a solution of tetramethyl ammonium hydroxide in ethanol at room temperature. The salt product which is formed is insoluble and is recovered by filtration.

Using this procedure one obtains the tetramethyl ammonium barbituric acid salts of the copolymer products of Examples 2, 3, 4, 5, 12, 13, and 22.

EXAMPLE 28

The barbituric acid carboxylic acid form of the copolymer product of Example 1 is obtained when a solution of the ammonium salt, obtained as described in Example 24, is acidified to a pH of two with dilute hydrochloric acid at room temperature. The acid form of the copolymer is quite insoluble in water and is recovered by filtration. The product is dried in a vacuum dessicator. The acid form of the copolymer readily redissolves in dilute aqueous base.

Using this procedure one obtains the acid form of the copolymer of Example 1 from any of the salt forms of this copolymer.

By using this procedure the carboxylic acid barbituric acid forms of the copolymers of Examples 6, 7, 8, 9, 10, 11, 14, 15, 16, 17, 20, 21 and 23 are obtained from the ammonium or sodium carboxylate salt forms which are described in Examples 24 and 25.

EXAMPLE 29

The ephedrine carboxylate salt of the copolymer product of Example 7 is obtained when the copolymer product of Example 7 is added with vigorous stirring to a solution of ephedrine in ethanol. The salt product is insoluble and is recovered by filtration.

By using this procedure the ephedrine carboxylate salts are obtained from any of the free carboxylic acid forms of the copolymers which are prepared as described in Example 28.

EXAMPLE 30

The copolymer product from Example 1 is hydrolyzed when the 5 g. of the copolymer is heated with about thirty ml. of 3 N ammonium hydroxide at 80° C. for thirty minutes. The resulting solid essentially insoluble product is recovered by filtration and is air dried. The hydrolyzed product has a structure consisting of the copolymerized forms of diallylbarbituric acid and of vinylene glycol.

Preferred monomers of Formula 1 for use in this invention are those where $R_1$ and $R_2$ are both hydrogen. Preferred monomers of Formula 2 for use in making the copolymers of this invention are those where when X and Y are both hydrogen, Z is selected from the group consisting of chlorine, carboxyl, acetoxy, and methoxy carbonyl; and when X is hydrogen and Y is methyl then Z is selected from the group consisting of carboxyl, and methoxy carbonyl and, finally, when Z is hydrogen, X and Y are both identical and are selected from the group consisting of carboxyl and methoxy carbonyl.

The claims are:

1. A substantially linear copolymer of (1) a compound of the formula:

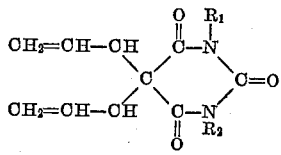

where $R_1$ and $R_2$ are selected from the group consisting of hydrogen and lower alkyl, and (2) a monoethylenically unsaturated compound which is copolymerizable with the compounds of (1) and which has the formula:

where X, Y and Z are each selected from the group consisting of hydrogen, chlorine, bromine, lower acyloxy, lower alkoxycarbonyl, lower perfluoroalkoxy carbonyl, carboxy, cyano, phenyl and methyl, and X and Y taken together with the two carbon atoms between them form a ring structure selected from the group consisting of 1,3-dioxol-2-one and dihydrofuran-2,5-dione; said copolymer containing in the polymerized form from about 1 to 80 mole percent of Formula 1 compound and from about 99 to 20 mole percent of Formula 2 compound.

2. A substantially linear copolymer of vinylene carbonate and diallylbarbituric acid, said copolymer containing in the polymerized form from about 99 to 20 mole percent of vinylene carbonate and from about 1 to 80 mole percent of diallylbarbituric acid.

3. A substantially linear copolymer of maleic anhydride and diallylbarbituric acid, said copolymer containing in the polymerized form from about 99 to 20 mole percent of maleic anhydride and from about 1 to 80 mole percent of diallylbarbituric acid.

4. A substantially linear copolymer of vinyl acetate and diallylbarbituric acid, said copolymer containing in the polymerized form from about 99 to 20 mole percent of vinyl acetate and from about 1 to 80 mole percent of diallylbarbituric acid.

5. A substantially linear copolymer of vinyl chloride and diallylbarbituric acid, said copolymer containing in the polymerized form from 99 to 20 mole percent of vinyl chloride and from about 1 to 80 mole percent of diallylbarbituric acid.

6. A substantially linear copolymer of ethyl acrylate and diallylbarbituric acid, said copolymer containing in the polymerized form from about 99 to 20 mole percent of ethyl acrylate and from about 1 to 80 mole percent of diallylbarbituric acid.

7. A substantially linear copolymer of acrylic acid and diallylbarbituric acid, said copolymer containing in the polymerized form from about 99 to 20 mole percent of acrylic acid and from about 1 to 80 mole percent of diallylbarbituric acid.

8. A substantially linear copolymer of acrylonitrile and diallylbarbituric acid, said copolymer containing in the polymerized form from about 99 to 20 mole percent of acrylonitrile and from about 1 to 80 mole percent of diallylbarbituric acid.

References Cited in the file of this patent

UNITED STATES PATENTS

| | | |
|---|---|---|
| 1,255,423 | Hussy | Feb. 5, 1918 |
| 1,261,235 | Hussy | Apr. 2, 1918 |
| 1,316,047 | Kubli | Sept. 16, 1919 |

UNITED STATES PATENT OFFICE
CERTIFICATE OF CORRECTION

Patent No. 3,057,829                                October 9, 1962

Charles D. Wright

It is hereby certified that error appears in the above numbered patent requiring correction and that the said Letters Patent should read as corrected below.

Column 5, line 72, strike out "to", first occurrence; column 6, line 39, for "azo-bisiobutyronitrile" read -- azo-bisisobutyronitrile --; columns 7 and 8, TABLE II, Ex. No. 19, fifth column thereof, for ".02/.10" read -- .002/.10 --.

Signed and sealed this 30th day of April 1963.

(SEAL)
Attest:

ERNEST W. SWIDER
Attesting Officer

DAVID L. LADD
Commissioner of Patents